United States Patent [19]

Murphy

[11] Patent Number: 5,479,716
[45] Date of Patent: Jan. 2, 1996

[54] CAPACITIVE BASED GRAVITY SENSOR

[75] Inventor: Michael E. Murphy, Ann Arbor, Mich.

[73] Assignee: Design & Test Technology, Inc., Ann Arbor, Mich.

[21] Appl. No.: 273,793

[22] Filed: Jul. 12, 1994

[51] Int. Cl.⁶ ................................................. G01C 9/06
[52] U.S. Cl. .............................................................. 33/366
[58] Field of Search ....................... 33/366, 312; 340/689

[56] References Cited

U.S. PATENT DOCUMENTS

| | | |
|---|---|---|
| 2,620,571 | 12/1952 | Varian . |
| 2,711,590 | 6/1955 | Wilcox . |
| 3,946,494 | 3/1976 | Wells ........................................ 33/366 |
| 4,521,973 | 6/1985 | Wiklund et al. . |
| 4,528,760 | 7/1985 | Plummer . |
| 4,628,612 | 12/1986 | Hori et al. . |
| 4,641,434 | 2/1987 | Engler ...................................... 33/366 |
| 4,644,662 | 2/1987 | Anderson et al. ....................... 33/366 |
| 4,846,954 | 7/1989 | Ryan et al. ............................... 33/366 |
| 4,912,662 | 3/1990 | Butler et al. . |
| 4,937,518 | 6/1990 | Donati et al. ............................ 33/312 |
| 5,170,567 | 12/1992 | Davis et al. .............................. 33/366 |
| 5,237,753 | 8/1993 | Carlson et al. .......................... 33/366 |

FOREIGN PATENT DOCUMENTS

| | | | |
|---|---|---|---|
| 546822 | 6/1993 | European Pat. Off. ................. 33/366 |
| 216012 | 12/1984 | Japan ...................................... 33/366 |
| 59208 | 3/1986 | Japan ...................................... 33/366 |
| 9309 | 1/1989 | Japan ...................................... 33/366 |
| 2204136 | 11/1988 | United Kingdom .................... 33/366 |
| 9011489 | 10/1990 | WIPO ..................................... 33/366 |

*Primary Examiner*—Thomas B. Will
*Attorney, Agent, or Firm*—Harness, Dickey & Pierce

[57] ABSTRACT

An improved inclination sensor in which electrically conductive elements are fabricated onto one or both surfaces of a flat plate. The plate comprising discrete, isolated sector sections having a distinct electrically conductive regions is oriented in a substantially vertical plane. The plate has an axis which lies in a horizontal plane and which is substantially perpendicular to the plate so that the plate may tilt about the axis. The plate is encased within a sealed chamber occupied by a fluid having electrical properties. In one embodiment a dielectric fluid occupies a first portion of a chamber and has a dielectric constant greater than that of a gas which occupies a second portion of the sealed chamber. The fluid flows in response to a change in the tilt of the sealed chamber and the plate. In a second embodiment a capacitive fluid changes the capacitance between the distinct electrically conductive regions of each section of the plate. By determining the capacitance between the electrically conductive regions in one or more of the sections, the tilt of the inclinometer may be determined.

21 Claims, 2 Drawing Sheets

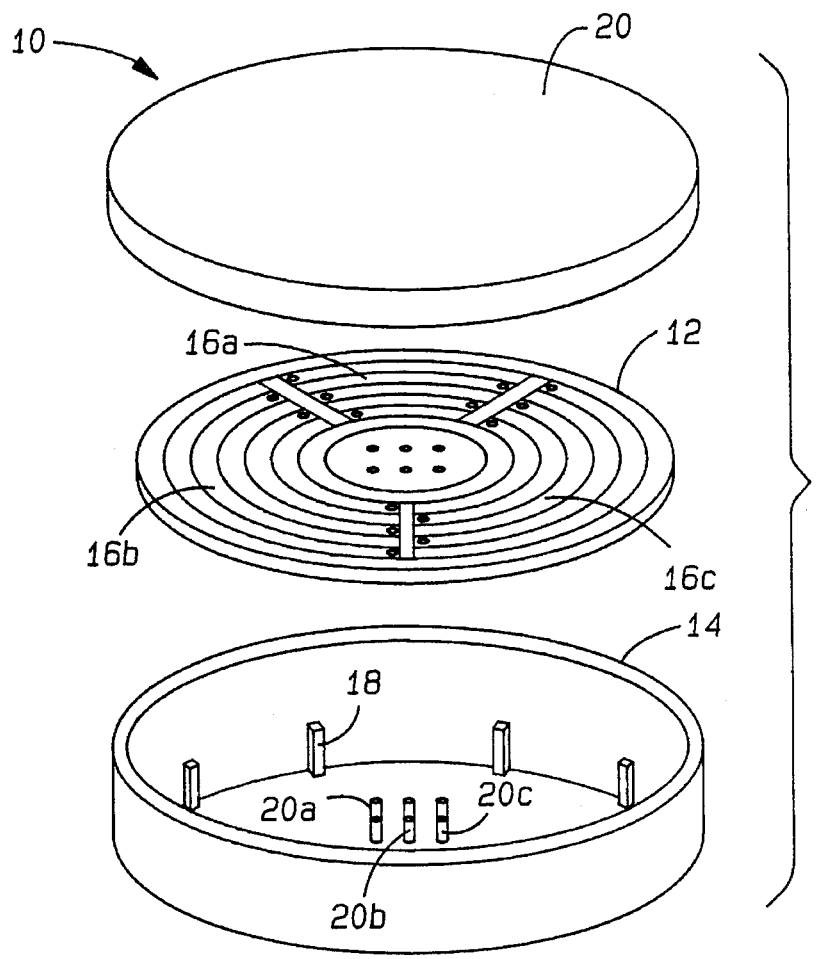
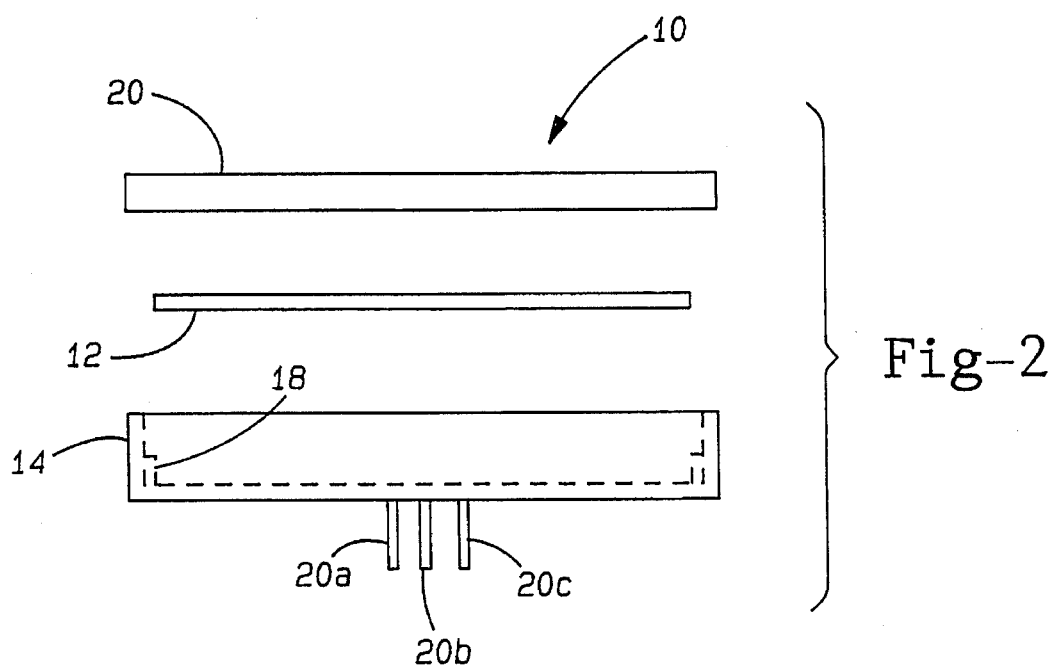

CAPACITIVE BASED GRAVITY SENSOR

BACKGROUND AND SUMMARY OF THE INVENTION

This invention relates to a sensor for detecting inclination of an object, and more particularly, to a sensor having capacitive sectors within which the capacitance varies in accordance with the inclination of the sensor.

There are currently a number of leveling sensors in the art which may be used to measure the tilt of an object with respect to a vertical plane. In their simplest form, a carpenter's level having a transparent tube partially filled with fluid to leave a bubble which travels within the tube as the angle of tilt of the tube varies. Typically, this tube has two lines scribed onto it between which the bubble must rest to indicate that the sensor is level horizontally. When one side of the sensor tilts downward from a horizontal plane, the bubble moves in a direction opposite the downward motion outside of the scribed lines. Carpenter levels and the like indicate qualitative measurements of a vertical orientation of the sensing device or a deviation from vertical in a particular direction. Other than through visual inspection of the position of the bubble within the transparent tube, these levels do not indicate with specificity the angular measurement from a horizontal plane through which the sensor has tilted. For a number of applications, such qualitative measurements are sufficient, but for other applications, specificity of the angle of inclination is required.

A number of inclination sensing instruments based on the properties of the fluid and transparent tube level may be employed to determine deviations from the horizontal. In one such inclinometer, the tilt indication occurs through the use of gravity-type potentiometers. Electrical conductors are placed in a conical or circular tube containing fluid to a predetermined level. Two equal length segments of electrical conductor extend from the conducting fluid so that when the device is level, equal segments of the wire are submerged in the electrical conducting fluid. When the tube is tilted from a horizontal reference, the tube rotates, creating unequal length segments of electrical conductor within the resistance fluid. The variance in resistance between the wires is used to determine qualitatively the tilt of the sensor. This device is extremely sensitive to the resistance of the wire which varies in accordance with the temperature coefficient of resistivity of the wire and the temperature coefficient of expansion of the fluid.

In another variety of electrical inclination sensing instruments, variations in capacitance caused by variations in the displacement of fluid partially filling a sealed cavity indicate inclination. The fluid typically has a dielectric constant which is greater than that of the dielectric constant of the atmosphere of the cavity not occupied by fluid. This fluid, having a different dielectric constant, allows the variance of capacitance between sections of electrical conductors in the sensor. In a number of capacitance-type sensors, a circular plate is divided into a number of sections each having an electrode. As the position of the fluid varies covering different sections, the capacitance between each section varies. By measuring the differences in the section-to-section capacitance, the amount of tilt of the instrument may be determined. Other inclinometers employ two plates between which is established a capacitance by either a dielectric fluid (or an electrolytic fluid if the electrical conductors on the plate are covered by a dielectric coating). By determining the capacitance between the parallel plates, in accordance with the variance in fluid position due to the tilt of the sensor, a quantitative measurement of the horizontal tilt of the sensor may be determined.

In general, a number of tilt sensors exist which depend on varying the capacitance between sections comprising substantial portions of separate plate sections of the sensor according to the percentage of area covered by a fluid, either dielectric or electrolytic. They generally rely on a capacitance between conductive areas located on separate substrates as in multiple plates around a bubble in a vile or tube, multiple plates around a sphere, or multiple plates on the same axis. Such sensor assemblies tend to be difficult to construct, align, and are rather sensitive to rolling movements and to changes in temperature.

This invention is directed towards an improved inclination sensor in which electrically conductive elements are fabricated onto one or both flat surfaces of a plate shaped substrate. Fabrication onto a single flat substrate enables the manufacture of the electrically conductive elements directly onto the substrate using known methods such as etching in foil or other printed circuit board techniques. This provides a sensor having mechanical characteristics such as rigidity, coefficient of expansion, and sensitivity to temperature which are significantly related to the mechanical properties of the substrate assembly and less so to mechanical properties dictated by the overall sensor assembly operation, as is encountered in any number of parallel plate designs. The precision of the mechanical construction of the capacitive elements is a function of, for example, photolithographic etching processes for applying the pattern onto the substrate which can be done with great precision.

A plate comprising discrete, isolated sections each spanning a portion of the circumference of the sensor having a distinct electrically conductive regions is oriented in a substantially vertical plane. The plate has an axis which lies in a horizontal plane and which is substantially perpendicular to the plate so that the plate may tilt about the axis. The plate is encased within a sealed chamber occupied by a fluid having electrical properties having a higher specific gravity than the outer fluid which may be a gas which occupy the chamber. In one embodiment of the invention, the fluid is a dielectric fluid having a dielectric constant greater than that of a gas which occupies a second portion of the sealed chamber. The fluid flows in response to a change in the tilt of the sealed chamber and the plate. The capacitive fluid changes the capacitance between the distinct electrically conductive regions of each section of the plate. By determining the capacitance between the electrically conductive regions of each section, the tilt of the inclinometer may be determined.

In a second embodiment of this invention, the fluid is an electrolytic fluid, and the electrically conductive regions of each section are coated with a dielectric so that a capacitance may be established between the electrolytic fluid and the electrically conductive regions via the dielectric coating. With such a configuration, it is possible to vary the capacitance between the electrically conductive regions in a manner similar to that described above. When the inclinometer tilts about the axis, the position of the fluid varies in response to the change in tilt. By determining the capacitance between the electrically conductive regions of each section, the tilt of the sensor may be determined.

Further objects, features and advantages of the invention will become apparent from a consideration of the following description and the appended claims when taken in connection with the accompanying drawings.

BRIEF DESCRIPTION OF THE DRAWINGS

FIG. 1 is a first exploded view of the inclinometer sensor according to this invention;

FIG. 2 is a second exploded view of the inclinometer sensor according to this invention;

DETAILED DESCRIPTION OF THE INVENTION

Figure 3:
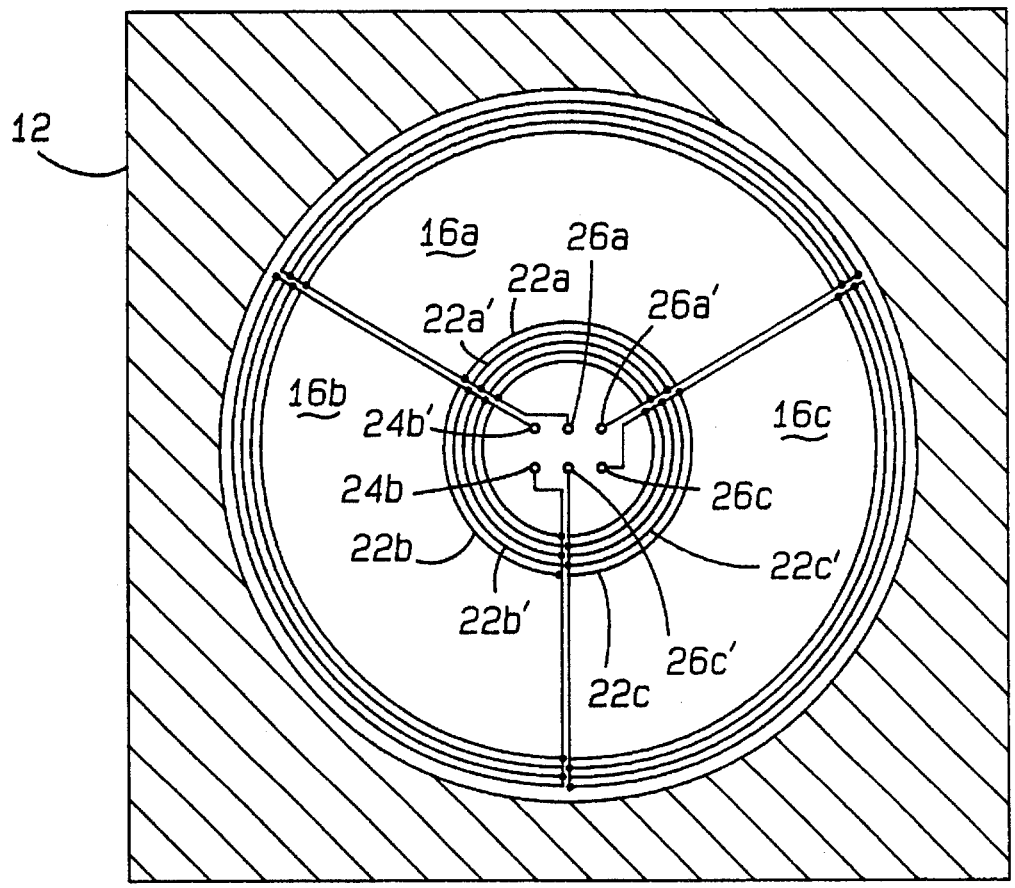
FIG. 3 depicts a partial section inclinometer sensor substrate having three sections each of which has electrically conductive regions interdigitated or interleaved so that a capacitance between the electrically conductive regions may be established.

Referring generally to FIGS. 1 and 2, two exploded views of the inclinometer 10 according to this invention are shown. In FIG. 1 a sensor substrate 12 is inserted into sensor body 14. Sensor substrate 12 may be made from conventional printed circuit board material and is a flat plate subdivided into three arcuate segment sections 16a–c. Each section 16a–c has electrically conductive regions such that a capacitance may be determined between each electrically conductive region of a particular section, to be explained further with respect to FIG. 3. Plate 12 engages sensor body 14 at lip 18, and is connected so that sensor plate 12 moves in accordance with sensor body 14. Terminal connections 20a–c enable the application of electrical signals to conductors on plate 12.

Sensor body 14 also contains a fluid having electrical properties which interacts with the electrically conductive regions of each section 16a–16c of sensor plate 12. The fluid may be either a dielectric fluid or an electrolytic fluid. If the fluid is an electrolytic fluid, the electrically conductive regions of plate 12 are also coated with a dielectric material in order to establish capacitance between various electrically conductive region of sensor plate 12. Sensor body 14 is then sealed with cover plate 20 to seal sensor body 14 against fluid leakage. The effectiveness of the seal may be enhanced by a O-ring (not shown) or any other type of material which would maintain a suitable seal.

Referring to FIG. 3, a front view of one face of plate 12 is shown. Plate 12 is divided into three arcuate segment sections 16a–c, each section having electrically conductive regions 22a–c and 22a'–c', respectively which are arranged in an interdigitated fashion and trace concentric arcuate pathes. The electrically conductive regions 22a–c and 22a'–c' span actually radially from the innermost segment to the outermost segments which are shown. The radially intermediate segments are left out in the drawing figure to leave space for the element numbers and lead lines. For each section 16a–c, the electrically conductive regions 22a–c and 22a'–c' are energized so that a capacitance may be established between each pair of conductive regions 22a—a', 22b—b', and 22c—c'. Thus, each pair of electrically conductive regions on a specified section 16a–c on plate 12 may have a capacitance between them which is dependant upon the conductor spacing and dielectric between them. The electrically conductive regions for a particular section are energized via a pair of terminals connected to a source of energization (not shown). For example, electrically conductive regions 22a and 22a' are energized via terminal connection 26a and 26a', respectively. In a similar manner, electrically conductive regions 22b and 22b' are energized via a pair of terminal 24b and 24b', respectively. Finally, electrically conductive regions 22c and 22c' are energized via terminal connections 26c and 26c'. Thus, three sources of energization, or one source of energization and switching means for applying energization signals to each of the terminal pairs 26a—a', 24b—b', or 26c—c' must be provided.

Several inventive aspects of inclinometer 10 using sensor plate 12 as shown in FIG. 3 will now be discussed. This sensor utilizes the capacitance created between the electrically conductive regions within one of the sections 16a–16c of sensor plate 12. The capacitance occurs in this embodiment by interdigitating the electrically conductive regions 22a–c and 22a'–c', respectively, to yield a pattern of concentric rings as shown in FIG. 3. In this manner, only one sensor plate 12 is required to determine the tilt of inclinometer 10. Moreover, at least one of the sections 16a–c is partially immersed in the fluid within the inclinometer 10. The capacitance between a respective pair of conductive regions 22a—a', 22b—b', or 22c—c' varies in accordance with the percentage of surface area of one or more section 16a–c covered by the liquid occupying the inclinometer 10 which has a higher specific gravity (density) than the gas above the liquid. In a related aspect of this invention, sensor plate 12 may be constructed as a substrate onto which the electrically conductive regions may be deposited using any one of a number of printed circuit board techniques known in the art. Thus, sensor plate 12 acquires the mechanical properties of a printed circuit board. The positioning of each conductive region 22a–c in relation to its paired conductive region 22a'–c', respectively, varies in accordance with the accuracy in resolution of the printed circuit board manufacturing process, which is extremely accurate and repeatable. By comparison, the accuracy of current inclinometers varies in accordance with assembly and alignment techniques of multiple substrates and other assembly components.

The sensitivity of inclinometer 10 may be increased by duplicating the pattern of the conductive regions 16a–c of FIG. 3 onto the opposite face of sensor plate 12, creating a mirrored pattern on the other side of the sensor plate 12. A dual sided sensor provides the added feature of reduced sensitivity to roll. If sensor plate 12 is normal to a horizontal plane and immersed approximately half way in the fluid, as the sensor body is rotated about an axis located in a horizontal plane and normal to the tilt axis, the increased surface covered by the fluid on one side of sensor plate 12 is offset by an equal decrease in coverage of the fluid on the opposite side of sensor plate 12. This offset may be used to compensate for roll of the sensor.

Figure 4:
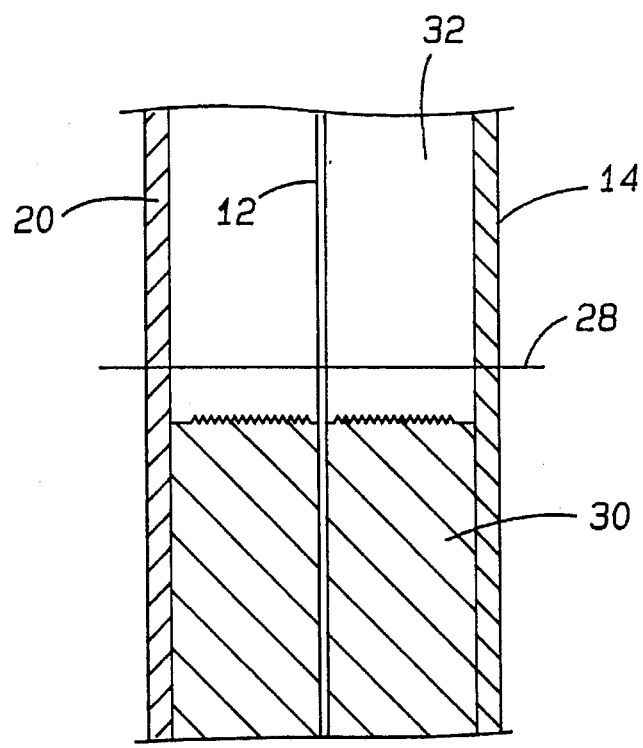
FIG. 4 depicts a partial cut away view of the inclinometer sensor assembly.

FIG. 4 depicts a partial sectional view of inclinometer 10 in a preferred orientation. The sensor plate 12, sensor body 14, and sensor top 20 of FIGS. 1 and 2 are shown positioned in a substantially vertical plane. Inclinometer 10 measures rotation in the vertical plane about central axis 28. Also shown in FIG. 4 is a dielectric fluid 30. Dielectric fluid is employed when sensor plate 12 is not covered with a dielectric coating. Dielectric fluid 30 occupies approximately 50% of the volume of sensor body 14 excluding that volume occupied by sensor plate 12 and sensor top 20. The residual volume is occupied generally by a gaseous medium 32 having a dielectric constant lower than that of dielectric fluid 30. Should the vertical orientation of inclinometer 10 vary, the sensor is said to roll. Such inclinometer roll 10 may be compensated if both faces of sensor plate 12 possess electrically conductive regions. The increase in fluid on one side of sensor plate 12 is offset by a decrease of fluid on the opposing face of sensor plate 12, effectuating compensation for roll by the sensor.

A sensor as described above offers several advantages over the prior art sensors. First, because the electrically conductive regions are positioned on one sensor plate 12 using known printed circuit board techniques, the electrically conductive regions may be positioned more accurately and consistently. Second, the accuracy of inclinometer 10 is enhanced because the separation between the electrically conductive regions does not vary in accordance with the mechanical assembly of the sensor, but is a function of the accuracy of printed circuit board manufacturing techniques which is highly controllable. Third, because the electrically conductive regions lie within the same plane, the inclinometer 10 is less effected by roll. Finally, if electrically conductive regions 22a–c and 22a'–c' are located in mirror image positions on both faces of sensor plate 12, some quantitative measure of the amount of roll may be made.

The teachings of this invention could be implemented in a multiple plate version which might be desired for higher output or enhanced roll sensitivity. However, in such an embodiment, the plates would be separated or isolated such that capacitance is not affected by minor deviations in plate spacing, unlike present sensors.

It is to be understood that the invention is not limited to the exact construction illustrated and described above, but that various changes and modifications may be made without departing from the spirit and scope of the invention as defined in the following claims.

What is claimed is:

1. An inclinometer for measuring tilt about a predetermined axis located in substantially in a horizontal plane:
   a plate oriented in a plane substantially normal to the predetermined axis and having discreet, isolated sector sections arranged about the axis, the sections each having electrically conductive regions between which a capacitance may be established;
   a sealed chamber in which the plate is placed;
   a fluid having electrical properties occupying a first portion of the sealed chamber, the fluid contacting the electrically conductive regions of at least one of the isolated sections of the plate when the inclinometer is oriented in a first tilted position about the predetermined axis, and contacting differing portions of at least one section of the plate when the inclinometer is oriented in a second titled position about the predetermined axis wherein the capacitance of at least one section varies in accordance with the orientation of the plate about the predetermined axis.

2. The inclinometer as defined in claim 1 further comprising:
   the fluid occupying the first portion of the sealed chamber having dielectric properties in accordance with a first dielectric constant; and
   a medium having dielectric properties in accordance with a second dielectric constant occupying a second portion of the chamber.

3. The inclinometer as defined in claim 2 wherein the plate electrically conductive regions comprises interdigitated electrical conductors.

4. The inclinometer as defined in claim 2 wherein the single plate is a printed circuit board and the electrically conductive regions comprise traces on said printed circuit board.

5. The inclinometer as defined in claim 2 wherein the electrically conductive regions are arranged on one face of the plate.

6. The inclinometer as claimed in claim 2 wherein the electrically conductive regions are arranged on both major sides of the plate.

7. The inclinometer as defined in claim 1 further comprising:
   the fluid having electrolytic properties; and
   a dielectric coating covering the electrically conductive regions of the plate.

8. The inclinometer as defined in claim 7 wherein the plate electrically conductive regions comprises interdigitated electrical conductors.

9. The inclinometer as defined in claim 7 wherein the plate is a printed circuit board and the electrically conductive regions comprise traces on said printed circuit board.

10. The inclinometer as defined in claim 7 wherein the electrically conductive regions are arranged on one side of the plate.

11. The inclinometer as defined in claim 7 wherein the electrically conductive regions are arranged on both sides of the plate.

12. An inclinometer for measuring tilt about a predetermined axis located in substantially in a horizontal plane:
   a plate oriented in a plane substantially normal to the predetermined axis and having discreet, isolated sector sections arranged about the axis, the sections each having electrically conductive regions between which a capacitance may be established;
   a sealed chamber in which the plate is placed;
   a fluid occupying a first portion of the sealed chamber having dielectric properties in accordance with a first dielectric constant and a medium having dielectric properties in accordance with a second dielectric constant, the second dielectric constant differing from the first dielectric constant, the fluid contacting the electrically conductive regions of at least one of the isolated sections of the plate when the inclinometer is oriented in a first tilted position about the predetermined axis, and contacting differing portions of at least one section of the plate when the inclinometer is oriented in a second titled position about the predetermined axis wherein the capacitance of at least one section varies in accordance with the orientation of the plate about the predetermined axis.

13. The inclinometer as defined in claim 12 wherein the plate electrically conductive regions comprises interdigitated electrical conductors.

14. The inclinometer as defined in claim 12 wherein the electrically conductive regions are arranged on one face of the plate.

15. The inclinometer as claimed in claim 14 wherein the plate is a printed circuit board and the electrically conductive regions are formed by traces on said printed circuit board.

16. The inclinometer as claimed in claim 12 wherein the electrically conductive regions are arranged on both sides of the plate.

17. An inclinometer for measuring tilt about a predetermined axis located in substantially in a horizontal plane:
   a plate oriented in a plane substantially normal to the predetermined axis and having discreet, isolated sector sections arranged about the axis, the sections each having electrically conductive regions between which a capacitance may be established;
   a coating covering the electrically conductive regions of the plate;
   a sealed chamber in which the plate is placed;
   an electrolytic fluid occupying a first portion of the sealed chamber, the fluid contacting the electrically conductive regions of at least one of the isolated sections of the plate when the inclinometer is oriented in a first tilted position about the predetermined axis, and contacting differing portions of at least one section of the plate when the inclinometer is oriented in a second titled position about the predetermined axis wherein the capacitance of at least one section varies in accordance with the orientation of the plate about the predetermined axis.

18. The inclinometer as defined in claim 17 wherein the plate electrically conductive regions comprises interdigitated electrical conductors.

19. The inclinometer as defined in claim 18 wherein the electrically conductive regions are arranged on one face of the plate.

20. The inclinometer as claimed in claim 17 wherein the electrically conductive regions are arranged on one side of the plate.

21. The inclinometer as claimed in claim 17 wherein the electrically conductive regions are arranged on both sides of the plate.

* * * * *